United States Patent
Kishi et al.

(10) Patent No.: US 10,410,301 B2
(45) Date of Patent: Sep. 10, 2019

(54) OPERATION PLAN PLANNING SYSTEM FOR PLANNING AN OPERATION PLAN OF A POWER PLANT AND OPERATION PLAN PLANNING METHOD FOR PLANNING AN OPERATION PLAN OF A POWER PLANT

(71) Applicant: MITSUBISHI HEAVY INDUSTRIES, LTD., Tokyo (JP)

(72) Inventors: Makoto Kishi, Tokyo (JP); Atsushi Matsuo, Tokyo (JP); Seiji Goto, Tokyo (JP); Yo Akiyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 144 days.

(21) Appl. No.: 15/554,317

(22) PCT Filed: Sep. 24, 2015

(86) PCT No.: PCT/JP2015/076991
§ 371 (c)(1),
(2) Date: Aug. 29, 2017

(87) PCT Pub. No.: WO2016/139836
PCT Pub. Date: Sep. 9, 2016

(65) Prior Publication Data
US 2018/0040079 A1   Feb. 8, 2018

(30) Foreign Application Priority Data
Mar. 2, 2015 (JP) .................................. 2015-040351

(51) Int. Cl.
*G06Q 50/06* (2012.01)
*G05B 15/02* (2006.01)
(Continued)

(52) U.S. Cl.
CPC ............. *G06Q 50/06* (2013.01); *G05B 15/02* (2013.01); *G06Q 10/04* (2013.01);
(Continued)

(58) Field of Classification Search
CPC ................ G06Q 30/0202; G06Q 50/06; H02J 2003/007; H02J 3/00; H02J 3/008; Y04S 10/54
See application file for complete search history.

(56) References Cited

U.S. PATENT DOCUMENTS 5,873,251 A      2/1999   Iino
5,966,925 A  *  10/1999   Torikai ..................... F02C 7/26
                                                            60/778
(Continued)

FOREIGN PATENT DOCUMENTS

JP    09-179604      7/1997
JP    2001-086645    3/2001
(Continued)

OTHER PUBLICATIONS

Mitra et al. "Optimal scheduling of industrial combined heat and power plants under time-sensitive electricity prices" from "Energy 54 (2013) 194-211" (Year: 2013).*

(Continued)

*Primary Examiner* — Yuhui R Pan
(74) *Attorney, Agent, or Firm* — Wenderoth, Lind & Ponack, L.L.P.

(57) ABSTRACT

A system for planning operation of a power plant capable of a first mode driving a power generator using a turbine and a second mode not driving the power generator using the turbine over a predetermined period. A determination unit determines whether a predicted power-selling price is higher than a power generation cost; and a planning unit calculates a loss index of the first and second modes in a case where (Continued)

the predicted selling price is equal to the generation cost or less within the predetermined period and formulates a plan to operate the power plant in a mode having a smaller loss index. The loss index of the first mode includes a power-selling loss that is a difference between the predicted selling price and the generation cost, and the loss index of the second mode includes a loss that is caused by not driving the power generator.

8 Claims, 8 Drawing Sheets

(51) Int. Cl.
    *G06Q 30/02*     (2012.01)
    *H02J 3/00*     (2006.01)
    *G06Q 10/04*     (2012.01)
    *G06Q 10/06*     (2012.01)

(52) U.S. Cl.
    CPC ..... *G06Q 10/0631* (2013.01); *G06Q 30/0202* (2013.01); *H02J 3/008* (2013.01); *H02J 2003/003* (2013.01); *H02J 2003/007* (2013.01); *Y04S 50/14* (2013.01)

(56) References Cited

U.S. PATENT DOCUMENTS

| 2004/0181491 | A1 | 9/2004 | Sato et al. |
| 2005/0015283 | A1 | 1/2005 | Iino et al. |

FOREIGN PATENT DOCUMENTS

| JP | 2001-318970 | 11/2001 |
| JP | 2002-281665 | 9/2002 |
| JP | 2006-271148 | 10/2006 |
| JP | 2007-159239 | 6/2007 |
| JP | 2008-146105 | 6/2008 |

OTHER PUBLICATIONS

International Search Report of the International Searching Authority dated Dec. 15, 2015 in International Application No. PCT/JP2015/076991.
International Preliminary Report on Patentability dated Sep. 5, 2017 in International Application No. PCT/JP2015/076991.
Notification of Reasons for Refusal dated Dec. 11, 2018 in corresponding Japanese Patent Application No. 2015-040351 with machine translation.

* cited by examiner

OPERATION PLAN PLANNING SYSTEM FOR PLANNING AN OPERATION PLAN OF A POWER PLANT AND OPERATION PLAN PLANNING METHOD FOR PLANNING AN OPERATION PLAN OF A POWER PLANT

TECHNICAL FIELD

The present invention relates to an operation plan planning system for a power plant and an operation plan planning method for a power plant for planning an operation plan of a predetermined period based on a comparison between a power generation cost and a predicted power-selling price of the power plant.

BACKGROUND ART

In recent years, power liberalization has been promoted overseas, and there are countries in which about 30% of power consumption is traded in a power wholesale market. While the structure of a power wholesale market is different from country to country, for example, there is a market called as a day ahead market (DAM) in which bidding is performed for each unit time before one day. A power-selling price in a power wholesale market is determined based on a balance between the demand and supply of power and greatly changes in time.

For this reason, in order for a power generation company to obtain a profit by participating in bidding, it is important to perform an optimal operation in accordance with a power-selling price and variations in the demand of power.

In Patent Literature 1, a technology has been disclosed which includes a step of setting a power-selling price of each period, a step of detecting each operation state that can be taken by a power plant for each period and registering a profit for each transition path reaching the operation state, and a step of finally planning an operation plan of the power plant based on a transition path through which the profit can be maximized. According to this technology, a profit of each period is acquired by decreasing a profit caused in selling power by a loss caused due to power generation variations (an event in which a contracted power generation amount and an actual power generation amount are different from each other).

In Patent Literature 2, a power generation plan/power selling plan generating method including a process of acquiring a probability distribution according to uncertainty factors (variations in the demand for power, variations in the unit price of fuel for power generation, and the like) for a balance generated according to power generation and power selling and a process of displaying the probability distribution in a time series has been disclosed. According to this method, it is disclosed that a correlation between a profit of an operation plan of the current state and a risk can be acquired, and a search for a plan for resolving the risk of the operation plan of the current state can be performed.

In Patent Literature 3, a power plant operation supporting system has been disclosed which includes an operation condition optimization calculating unit calculating an optimal operation condition at which the power generation performance value of a power plant is the maximum based on a probability distribution of power demand predicted values and power trading market price predicted values, a risk evaluating unit calculating and evaluating a risk value for damaging the optimization of the optimal operation condition, and a reserved power optimizing unit.

The reserved power optimizing unit calculates optimal reserved power of a power generation amount capable of responding to a load increase request from customers in a short time and calculates load conditions that are optimal for maintaining the reserved power in terms of cost. One of these optimal load conditions is a rated overload, and, in Patent Literature 3, it is described that, in an operation under a rated overload, an operation cost such as a decrease in the device life due to an unnecessary stress or an increase in the maintenance cost due to the application of stress that is not needed for a plant increases.

In Patent Literature 3, a management system for a power plant planning an operation plan such that a power generation profit is optimal with a life consumption cost and the risk of unplanned plant stop (stop due to a trouble) considered has been disclosed.

Here, a life consumption cost is determined based on the amount of a remaining life consumed for a life cost (a cost taken until replacement after a certain component is consumed from the time of a new product) and is calculated as a product of a remaining life consumption ratio (a ratio at which the remaining life is consumed) and a life cost (life consumption cost=remaining life consumption ratio×life cost).

CITATION LIST

Patent Literature

Patent Literature 1: JP 2002-281665 A
Patent Literature 2: US 2004/0,181,491 A
Patent Literature 3: US 2005/0,015,283 A

SUMMARY OF INVENTION

Technical Problem

In the technology disclosed in Patent Literature 1, while an operation plan of a power plant is planned with a loss caused due to power generation variations focused on, potential losses such as consumption of hot parts according to the operation of the power plant and a startup stress of the power plant are not considered. When an operation plan of a power plant is planned without considering such potential losses, a profit may be acquired for a short period. However, a replacement interval of consumable supplies and various maintenance intervals of the power plant are shortened, and, in a case where a profit/loss over a long period is considered, an operation plan having high profitability is not planned.

In addition, when a startup stress or the amount of fuel consumed from the startup of an operation to the stabilization of an operation is considered, there are also cases where, in a period in which power selling is not performed, a no-load operation, in which the operation of a turbine is continued in a state in which the turbine and a generator are disconnected, has a loss lower than that of a case where the power plant is temporarily stopped when a profit/loss over a long period is considered. However, in the technologies disclosed in Patent Literatures 1 to 3, there is no consideration of a no-load operation.

The present invention is invented in consideration of the problems described above, and an object thereof is to provide an operation plan planning system for a power plant and an operation plan planning method for a power plant capable of planning a highly profitable operation plan.

Solution to Problem

In order to achieve the objects described above, a planning system for planning an operation of a power plant according to the present invention, wherein the power plant is capable of executing one of a first operation mode driving a power generator by using a turbine and a second operation mode not driving the power generator by using the turbine over a predetermined period. The planning system includes: a determination unit configured to determine whether or not a predicted power-selling price is higher than a power generation cost; and a planning unit configured to calculate a loss index of each of the first operation mode and the second operation mode in a case where the predicted power-selling price is equal to the power generation cost or less within the predetermined period and to plan the operation plan such that the power plant is operated in an operation mode of which the loss index is smaller. The loss index corresponding to the first operation mode includes a power-selling loss that is a difference between the predicted power-selling price and the power generation cost, and the loss index corresponding to the second operation mode includes a loss that is caused by not driving the power generator.

It is preferable that the second operation mode includes a no-load operation mode operating in a state in which the turbine and the power generator are disconnected from each other and a stop mode stopping the turbine.

It is preferable that each of the loss index corresponding to the first operation mode and the loss index corresponding to the second operation mode further includes a maintenance loss.

It is preferable that the second operation mode includes a no-load operation mode operating in a state in which the turbine and the power generator are disconnected from each other and a stop mode stopping the turbine, the maintenance loss includes an operation time loss consuming a life relating to an operation time of a component configuring the power plant according to an accumulated operation time of the power plant and a number of times of starting-up loss consuming a life relating to the number of times of starting up of the component according to an accumulated number of times of starting up of the power plant, the maintenance loss of each of the first operation mode and the no-load operation mode has the operation time loss as a main factor, the maintenance loss of the stop mode has the number of times of starting-up loss as a main factor, and the planning unit is configured to: determine the maintenance loss of each of the first operation mode and the no-load operation mode by using a first weighting coefficient; determine the maintenance loss of the stop mode by using a second weighting coefficient; to decrease the first weighting coefficient, increase the second weighting coefficient, or decrease the first weighting coefficient and increase the second weighting coefficient as a ratio of the accumulated number of times of starting up to the number of times of starting up increases, and to increase the first weighting coefficient, decrease the second weighting coefficient, or increase the first weighting coefficient and decrease the second weighting coefficient as a ratio of the accumulated operation time to the life relating to the operation time increases.

It is preferable that three prices of a lowest predicted power-selling price, an average predicted power-selling price, and a highest predicted power-selling price are used as the predicted power-selling price, the determination unit compares each of the lowest predicted power-selling price, the average predicted power-selling price, and the highest predicted power-selling price with the power generation cost and determines whether or not the predicted power-selling price is higher than the power generation cost, and the planning unit plans a provisional operation plan for the predetermined period by performing the selection control for each of the lowest predicted power-selling price, the average predicted power-selling price, and the highest predicted power-selling price and plans the operation plan by composing a first provisional operation plan based on the lowest predicted power-selling price, a second provisional operation plan based on the average predicted power-selling price, and a third provisional operation plan based on the highest predicted power-selling price.

It is preferable that the planning unit performs the composition by employing the operation mode that is selected most among the operation modes selected for the same time for each of the first provisional operation plan, the second provisional operation plan, and the third provisional operation plan.

It is preferable that the planning unit performs the composition by employing the operation mode selected in the second provisional operation plan in a case where the operation mode selected for the same time is different in each of the first provisional operation plan, the second provisional operation plan, and the third provisional operation plan.

It is preferable that a selection operation mode acquiring unit is further included, and the planning unit performs the composition by employing the operation mode acquired by the selection operation mode acquiring unit in a case where the operation mode selected for the same time is different in each of the first provisional operation plan, the second provisional operation plan, and the third provisional operation plan.

It is preferable that a recommended operation mode displaying unit is further included, and the planning unit causes the recommended operation mode displaying unit to display the operation mode of the second provisional operation plan as a recommended operation mode in a case where the operation mode selected for the same time is different in each of the first provisional operation plan, the second provisional operation plan, and the third provisional operation plan.

It is preferable that the operation loss includes a fuel cost not contributing to power generation that is consumed at the time of staring up the power plant and at the time of the no-load operation.

In order to achieve the objects described above, a planning method for planning an operation plan of a power plant according to the present invention, wherein the power plant is capable of executing one of a first operation mode driving a power generator by using a turbine and a second operation mode not driving the power generator by using the turbine over a predetermined period. The planning method includes: determining whether or not a predicted power-selling price is higher than a power generation cost; and calculating a loss index of each of the first operation mode and the second operation mode in a case where the predicted power-selling price is equal to the power generation cost or less within the predetermined period and planning the operation plan such that the power plant is operated in an operation mode of which the loss index is smaller, the loss index corresponding to the first operation mode includes a power-selling loss that is a difference between the predicted power-selling price and the power generation cost, and the loss index corresponding to the second operation mode includes a loss that is caused by not driving the power generator.

According to the present invention, in a case where a predicted power-selling price is equal to a power generation cost or less, a loss index is calculated for each of a first operation mode driving a generator by using a turbine and a second operation mode not driving the generator by using the turbine, and a power plant is operated in an operation mode of which the loss index is smaller. Since the loss index is in consideration of an operation loss not contributing to power selling in addition to a power-selling loss, an operation plan having high profitability in which the operation loss is considered can be planned.

Advantageous Effects of Invention

According to the present invention, for a profit period in which a predicted power-selling price is higher than a power generation cost, a power-selling operation mode is selected, and, for a loss period in which a predicted power-selling price is equal to a power generation cost or less, an operation mode having a lowest loss index is selected from among the power-selling operation mode, a no-load operation mode, and a stop mode. Since the loss index is in consideration of a maintenance loss and an operation loss not contributing to power selling in addition to a power-selling loss, a highly-profitable operation plan in consideration of losses such as a potential loss according to maintenance and an operation loss not contributing to power selling can be planned.

DESCRIPTION OF EMBODIMENTS

Hereinafter, embodiments of the present invention will be described with reference to the drawings.

In each embodiment represented below, an example will be described in which an operation plan planning system for a power plant is applied for planning an operation plan of the power plant over 24 hours (predetermined period) when a tender of a day ahead market is performed.

Embodiments represented below are merely examples, and there is no intention of excluding the applications of various modifications or various technologies not clearly expressed in the embodiments represented below. Configurations of the embodiments represented below may be variously modified in a range not departing from the concepts thereof and can be selected as needed or can be appropriately combined.

1. First Embodiment

[1-1. Configuration]

The whole configuration of an operation plan planning system for a power plant according to a first embodiment of the present invention will be described with reference to FIGS. 1 to 5.

Figure 1:
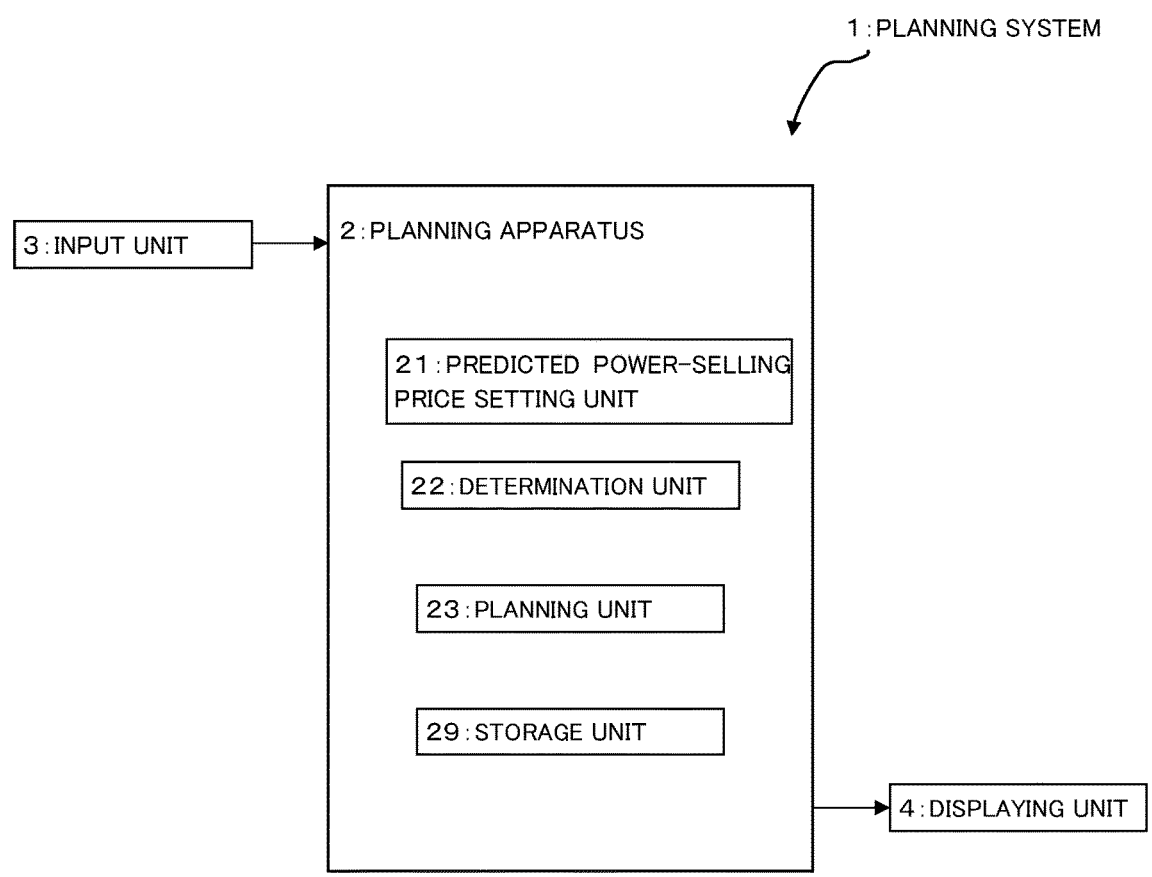
FIG. 1 is a functional block diagram that illustrates the configuration of an operation plan planning system for a power plant according to a first embodiment of the present invention.

FIG. 1 is a functional block diagram that illustrates the configuration of an operation plan planning system for a power plant according to the first embodiment of the present invention.

Figure 2:
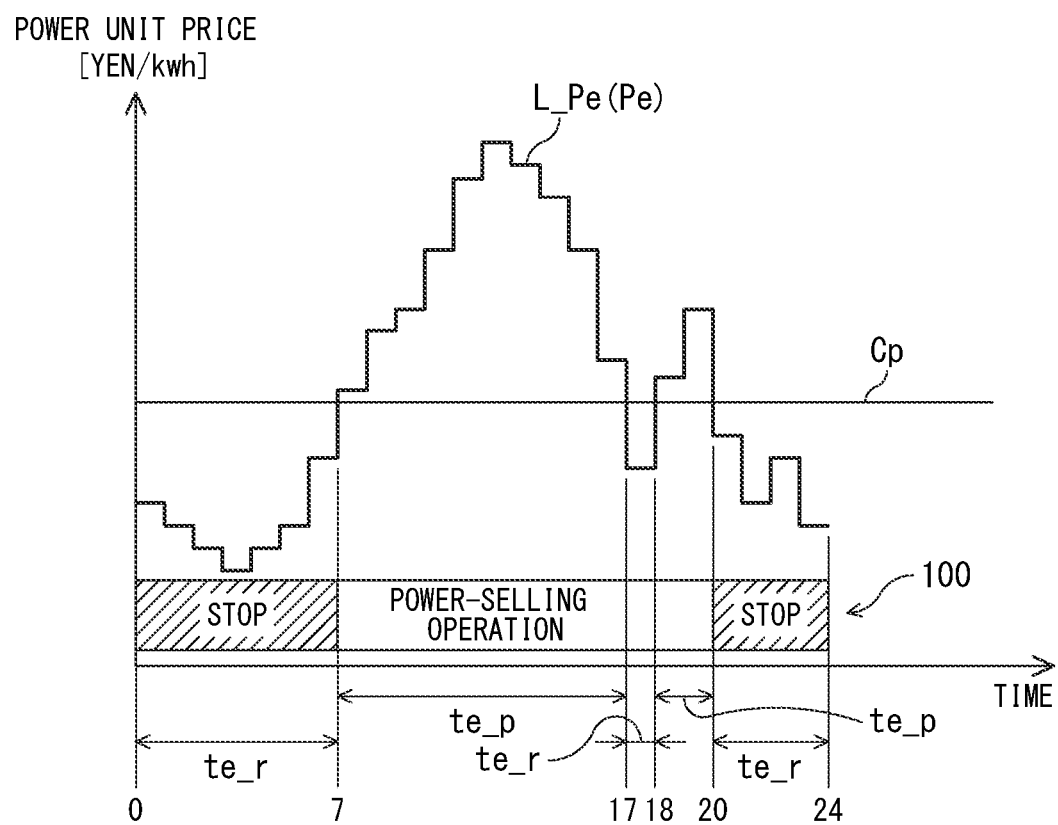
FIG. 2 is a schematic diagram that illustrates a planning unit according to the first embodiment of the present invention and is a diagram in which a predicted power-selling price line L_Pe (predicted power-selling price Pe) and a power generation cost Cp are plotted on a graph having the power unit price as the horizontal axis and the time as the horizontal axis, and operation plans are aligned.

FIG. 2 is a diagram in which a predicted power-selling price line L_Pe (predicted power-selling price Pe) and a power generation cost Cp are plotted on a graph having the power unit price as the horizontal axis and the time as the horizontal axis, and operation plans are aligned.

Figure 3:
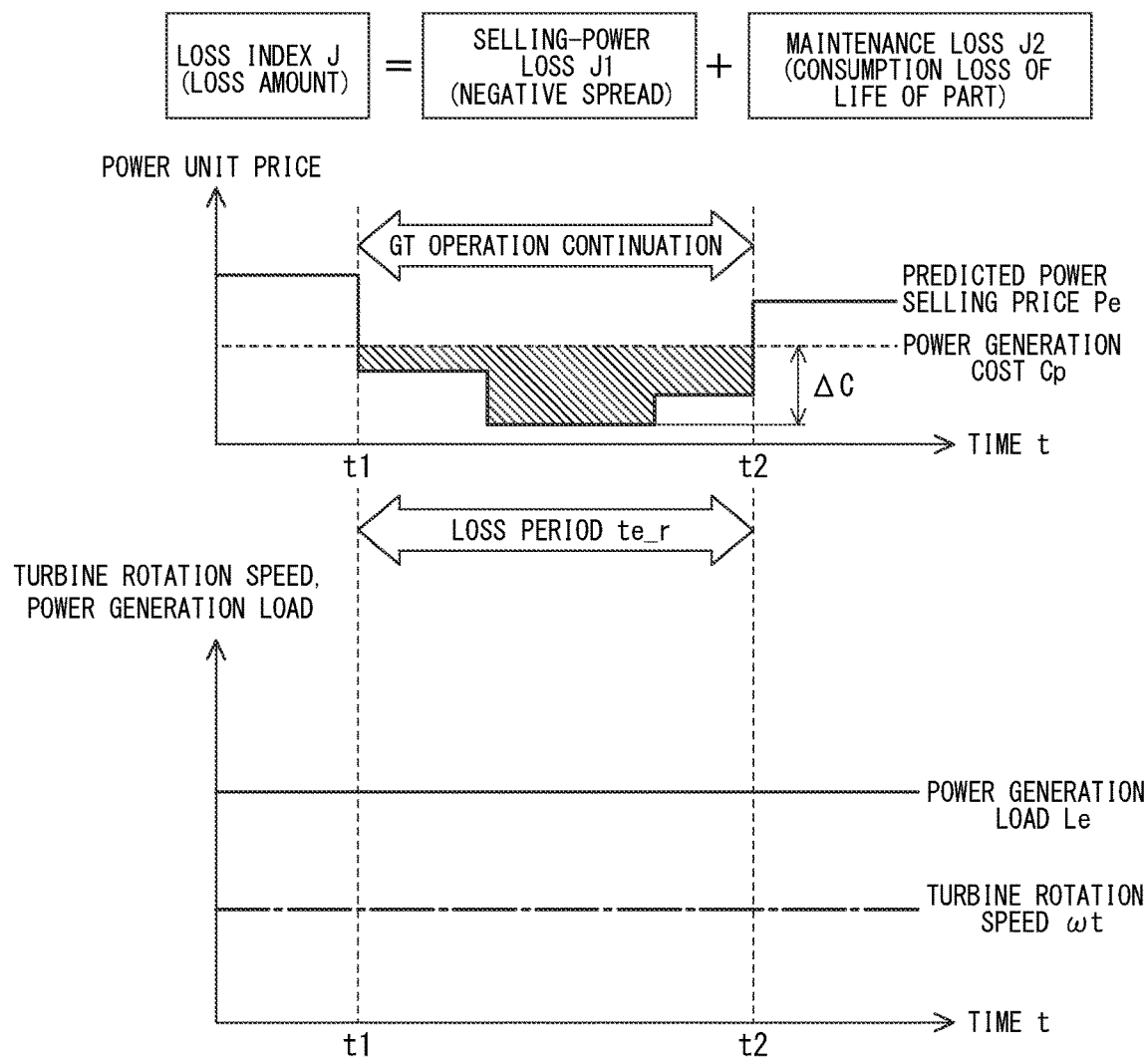
FIG. 3 is a schematic diagram that illustrates a predicted power-selling price Pe, a power generation cost Cp, a power generation load Le, a turbine rotation speed ωt, and a calculation equation of a loss index J to be aligned in a power-selling operation mode according to the first embodiment of the present invention.

FIG. 3 is a diagram that illustrates a predicted power-selling price Pe, a power generation cost Cp, a power generation load Le, a turbine rotation speed ωt, and a calculation equation of a loss index J to be aligned in a power-selling operation mode.

Figure 4:
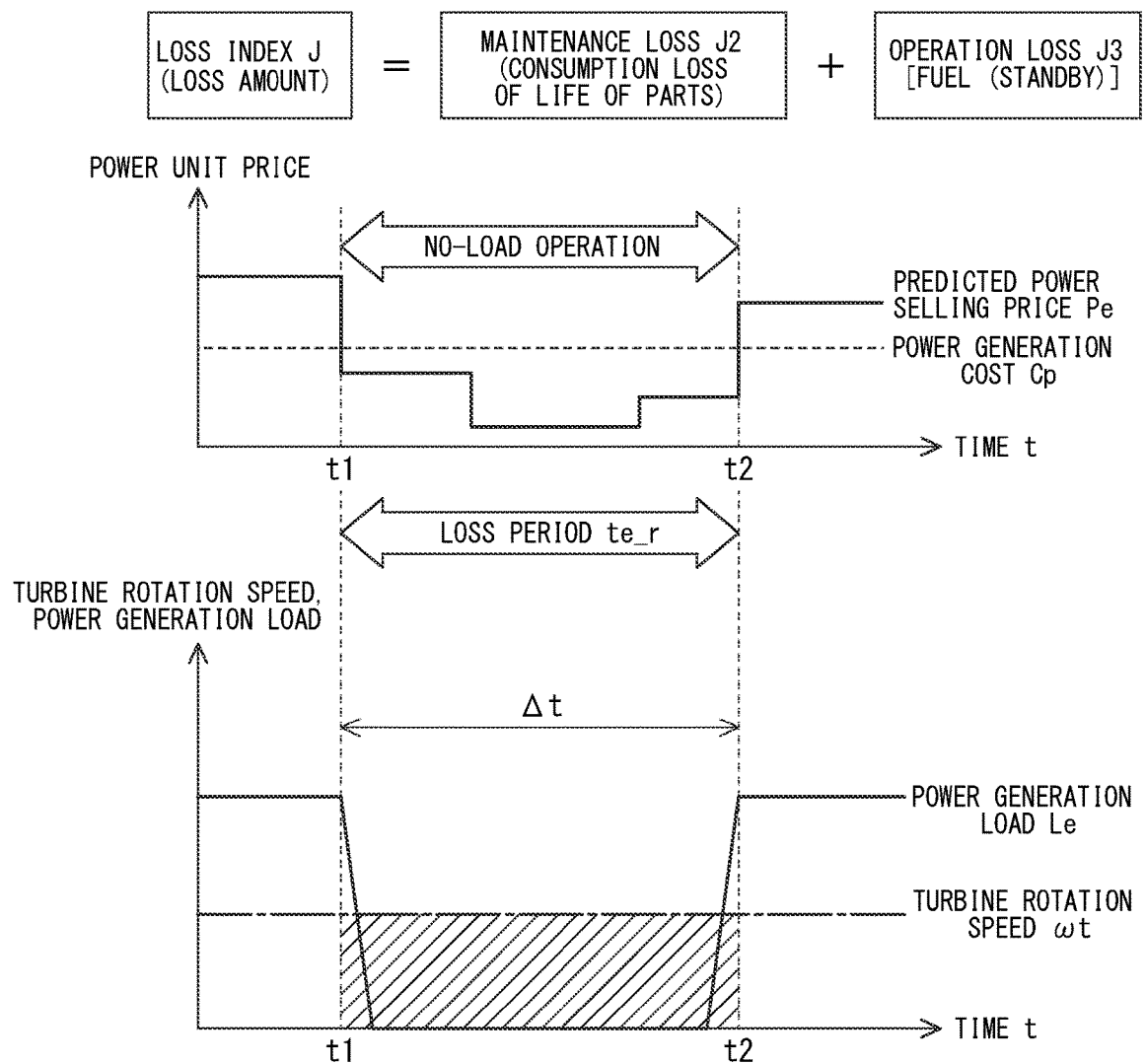
FIG. 4 is a diagram that illustrates a predicted power-selling price Pe, a power generation cost Cp, a power generation load Le, a turbine rotation speed ωt, and a calculation equation of a loss index J to be aligned in a no-load operation mode according to the first embodiment of the present invention.

FIG. 4 is a diagram that illustrates a predicted power-selling price Pe, a power generation cost Cp, a power generation load Le, a turbine rotation speed ωt, and a calculation equation of a loss index J to be aligned in a no-load operation mode.

Figure 5:
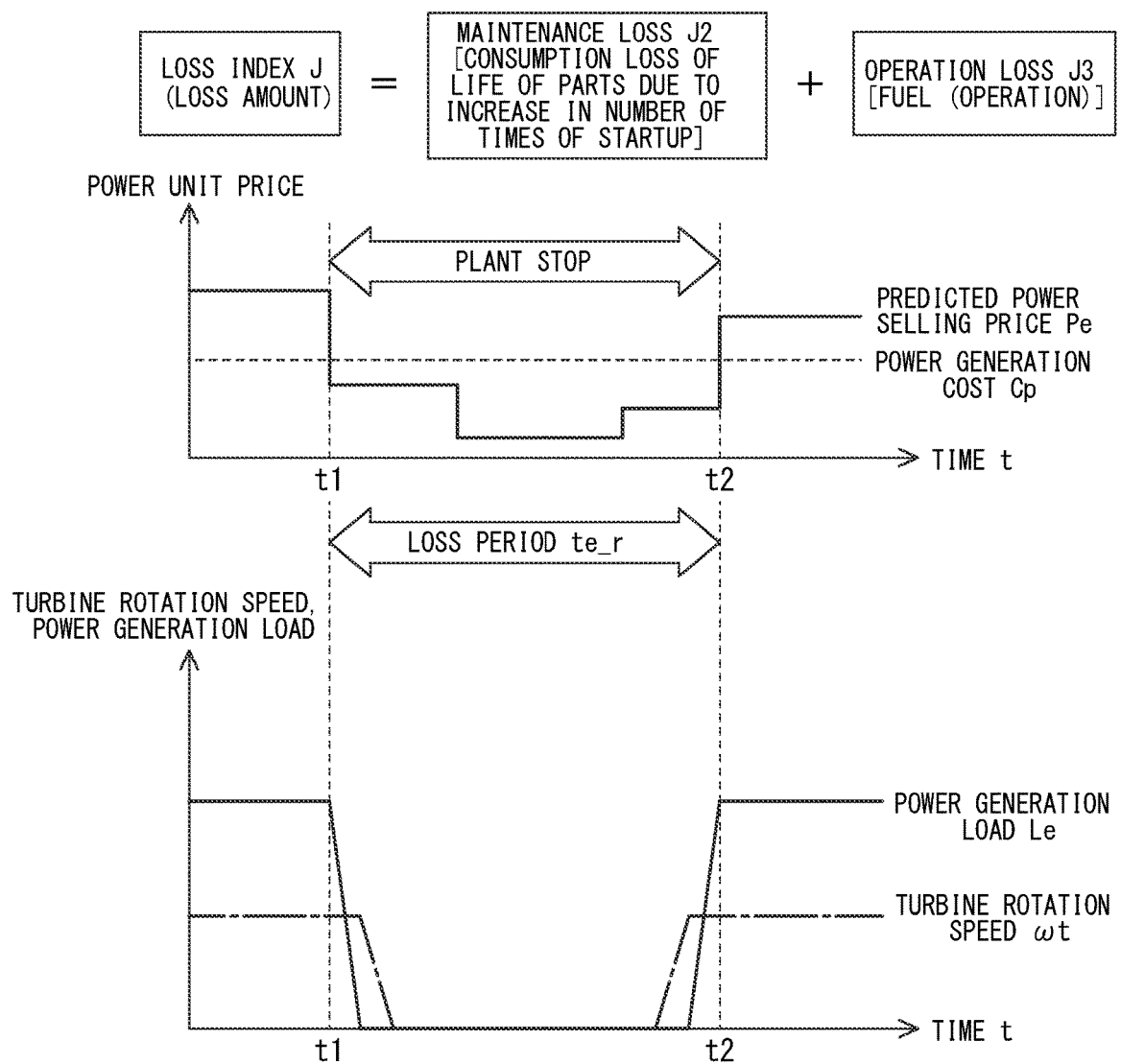
FIG. 5 is a diagram that illustrates a predicted power-selling price Pe, a power generation cost Cp, a power generation load Le, a turbine rotation speed ωt, and a calculation equation of a loss index J to be aligned in a stop mode according to the first embodiment of the present invention.

FIG. 5 is a diagram that illustrates a predicted power-selling price Pe, a power generation cost Cp, a power generation load Le, a turbine rotation speed ωt, and a calculation equation of a loss index J to be aligned in a stop mode.

The operation plan planning system for a power plant (hereinafter, also referred to as a planning system) 1 according to this embodiment, as illustrated in FIG. 1, is configured to include: a planning apparatus 2, an input unit (input device) 3 inputting various kinds of information to the planning apparatus 2, and a displaying unit (display device) 4 outputting various kinds of information from the planning apparatus 2.

In addition, the input unit 3 and the displaying unit 4 may be connected to the planning apparatus 2 through a communication line such as the Internet or the like.

The planning apparatus 2 is configured to include: a predicted power-selling price setting unit 21; a determination unit 22; a planning unit 23; and a storage unit 29. In the storage unit 29, various programs and data needed for controlling the predicted power-selling price setting unit 21, the determination unit 22, and the planning unit 23 are stored. In this embodiment, while the planning apparatus 2 is configured by a single device (in other words, the predicted power-selling price setting unit 21, the determination unit 22, the planning unit 23, and the storage unit 29 are configured by a control function of a same device), the configuration is not limited thereto. For example, the predicted power-selling price setting unit 21, the determination unit 22, the planning unit 23, and the storage unit 29 may be configured over a plurality of devices, and the plurality of devices may be connected through a communication line such as the Internet.

Hereinafter, the predicted power-selling price setting unit 21, the determination unit 22, and the planning unit 23 will be described.

The predicted power-selling price setting unit 21 predicts a predicted power-selling price line L_Pe of predicted target date (here, the next day of the bidding) based on a past result. The predicted power-selling price Pe changes with respect to time, and the predicted power-selling price line L_Pe represents a 24-hour transition of the predicted power-selling price Pe. Here, the predicted power-selling price line L_Pe is a step graph generated by connecting predicted power-selling prices Pe estimated at the interval of one hour (see FIG. 2). The predicted power-selling price Pe is acquired by correcting an average value of past results based on predicted temperature and predicted weather of a prediction target day.

Here, the predicted power-selling price setting unit 21 is not indispensable, but predicted power-selling price information may be acquired from the outside and be stored in the storage unit 29.

The determination unit 22, for each hour, compares a predicted power-selling price Pe with a power generation cost Cp per unit power amount and determines whether or not the predicted power-selling price Pe is higher than the power generation cost Cp. The power generation cost Cp is determined according to various specifications (the form of the power plant, used fuel, the type o a turbine driving source, and the like) of the power plant. Here, the power generation cost Cp is appropriately input from the input unit 3 and is stored in the storage unit 10. In a case where the power generation cost Cp is predicted to be constant over a long period, the power generation cost Cp may be stored in the storage unit 10 in advance as a fixed number.

The planning unit 23 performs selection control selecting an operation mode (hereinafter, simply referred to as a mode) of a power plant for each unit time (here, for each one hour), thereby planning an operation plan over 24 hours (predetermined period).

Here, the operation mode of the power plant will be described. The power plant generates power by driving a power generator using a turbine and here, represents a gas turbine combined cycle power plant (GTCC) including a gas turbine, an exhaust gas boiler, a steam turbine, and a power generator. In description presented below, a gas turbine and a steam turbine will be referred to as turbines altogether.

As operation modes that may be selected by the power plant, there are three operation modes including a power generation operation mode, a no-load operation mode, and a stop mode.

The power generation operation mode is an operation mode operating in a state in which the turbine is connected to the power generator (in other words, generating power). In the power generation operation mode, power is generated, and accordingly, power selling can be performed. Thus, hereinafter, the power generation operation mode will be referred to as a selling-power operation mode.

The no-load operation mode is an operation mode operating in a state in which the turbine is disconnected from the power generator (in other words, the turbine is operated in a state in which no load is engaged). In the no-load operation mode, since the power generator is not driven (power is not generated), power selling is not performed.

The stop mode is an operation mode in which the supply of fuel to the gas turbine is stopped, and the turbine, and consequently, the power generator is stopped. In the stop mode, since the power generator is stopped (power is not generated), power selling is not performed.

Hereinafter, the planning unit 23 will be described more specifically with reference to FIG. 2.

The planning unit 23 selects the power-selling operation mode as an operation mode based on a result of the comparison performed by the determination unit 22 for a time period (in other words, a profit period te_p in which a profit can be expected when power is generated) in which the predicted power-selling price Pe is higher than the power generation cost Cp. In the example illustrated in FIG. 2, for each of a time period of 7 o'clock to 17 o'clock and a time period of 18 o'clock to 20 o'clock, a profit period te_p is determined, and the power-selling operation mode is selected.

On the other hand, the planning unit 23 selects one of the power-selling operation mode, the no-load operation mode, and the stop mode as an operation mode based on a result of the comparison performed by the determination unit 22 for a time period (in other words, a loss period te_r in which a loss occurs when power is generated) in which the predicted power-selling price Pe is equal to the power generation cost Cp or less by using a loss index (loss amount) J calculated using the following Equation (1).

More specifically, the planning unit 23 calculates a loss index J by using a power-selling loss J1, a maintenance loss J2, and an operation loss (hereinafter, simply referred to as an operation loss) J3 not contributing to power selling by using the following Equation (1) for each of three cases including a case where the power-selling operation mode is performed, a case where the no-load operation mode is performed, and the stop mode is performed (a case where the power plant are stopped). Then, the planning unit 23 selects an operation mode of which the loss index J is smallest.

$$\text{Loss index } J = \text{Power-selling loss } J1 + \text{Maintenance Loss } J2 + \text{Operation Loss } J3 \quad (1)$$

Here, the power-selling loss J1 is a loss (a so-called negative spread) that occurs due to the predicted power-selling price Pe being lower than the power generation cost Cp in a case where power-selling is performed. The maintenance loss J2 is a loss (a consumption loss of the life of a part) due to an increase in the cost occurring as a result of replacement of a component needed according to consumption of a component (part) in other words, consumption of a life or the like. The operation loss is a fuel cost and the like consumed at the time of not contributing to power selling (power generation) such as at the time of startup or at the time of performing the no-load operation.

In the example illustrated in FIG. 2, for three time periods of 0 o'clock to 7 o'clock, 17 o'clock to 18 o'clock, and 20 o'clock to 24 o'clock, a loss period te_r is determined by the planning unit 23, and an operation mode is selected based on the loss index J for each loss period te_r. As a result, the stop mode is selected for 0 o'clock to 7 o'clock, the power-selling operation mode is selected for 17 o'clock to 18 o'clock, and the stop mode is selected for 20 o'clock to 24 o'clock. For the other periods, in other words, for the profit period te_p, the power-selling operation mode is selected as an operation mode as described above.

In other words, in the example illustrated in FIG. 2, an operation plan 100 of 24 hours is planned in which the stop mode is set for 0 o'clock to 7 o'clock, the power-selling operation mode is set for 7 o'clock to 20 o'clock, and the stop mode is set for 20 o'clock to 24 o'clock.

In addition, in a case where the operation plan illustrated in FIG. 2 is planned, normally, bidding is performed for 7 o'clock to 20 o'clock in which power is generated, and bidding is not performed for the other time.

Hereinafter, the calculation of the loss index J in the power-selling operation mode, the no-load operation mode, and the stop mode will be further described with reference to FIGS. 3 to 5.

First, the power-selling operation mode will be described with reference to FIG. 3. In a case where the power-selling operation mode is selected in the loss period te_r in which the predicted power-selling price Pe is lower than the power generation cost Cp, the driving of the power generator according to the operation of the gas turbine (GT) is continued, and the turbine rotation speed ωt and the power generation load Le have values of predetermined values or more. For this reason, the operation loss J3 that is a cost at the time of startup or accompanying the no-load operation does not occur. Accordingly, the loss index J in the power-selling operation mode is a sum of the power-selling loss J1 and the maintenance loss J2.

Described in more specifically, the loss index J is calculated using the following Equations (2) to (4) by using a loss ΔC (=a power generation cost Cp−a predicted power-selling price Pe) per unit power generation amount, a power generation load Le for a loss period te_r, a maintenance interval INT_CI until CI is performed, a cost C_CI relating to CI, a maintenance interval INT_TI until TI is performed, a cost C_TI relating to TI, a maintenance interval INT_MI until MI is performed, a cost C_MI relating to MI, and a time Δt of a loss period te_r (=end time t2−start time t1 of the loss period te_r).

$$J = J1 + J2 \quad (2)$$

[Mathematical Formula 1]

$$J1 = \int_{t1}^{t2} (\Delta C \times Le) dt \quad (3)$$

[Mathematical Formula 2]

$$J2 = C\_CI \times \frac{\Delta t}{INT\_CI} + C\_TI \times \frac{\Delta t}{INT\_TI} + C\_MI \times \frac{\Delta t}{INT\_MI} \quad (4)$$

Here, CI is inspection around a combustor called a combustor inspection and performs maintenance or replacement of a part (CI part) around the combustor. TI is inspection around a turbine called a turbine inspection and performs maintenance or replacement of a part (TI part) around of the turbine. MI is inspection of the whole power plant called a major inspection and performs maintenance or replacement of a part (MI part) of the whole power plant.

Each of the inspection intervals (hereinafter, simply referred to as intervals) INT_CI, INT_TI, and INT_MI is an interval until next inspection is performed after certain inspection is performed and is based on an accumulated operation time. In other words, each inspection interval is a use limit according to an accumulated operation time, and, when it is the accumulated operation time, repair or replacement according to inspection needs to be performed. The intervals are short in order of CI, TI, and MI (INT_CI<INT_TI<INT_MI), and the cost (a repair cost or a replacement cost of a part) is low in order of CI, TI, and MI (C_CI<C_TI<C_MI).

By using Equation (3) described above, a power-selling loss occurring in a diagonal-line area defined by a time Δt (in other words, the length of a loss period te_r) of time t1 to time t2 and ΔC that is a differential amount between a power generation cost Cp and a predicted power-selling price Pe is calculated.

By using Equation (4) described above, a potential maintenance loss for this time Δt is calculated by respectively multiplying ratios of the time Δt of the time t1 to the time t2 (in other words, the length of the loss period te_r) to the inspection intervals INT_CI, INT_TI, INT_MI by the costs C_CI, C_TI, and C_MI needed for the inspection CI, the inspection TI, and the inspection MI.

Next, the no-load operation mode will be described with reference to FIG. 4. In the loss period te_r, in a case where the no-load operation mode is selected, there is no power generation (the power generation load Le is zero ("0")), and power selling is not performed. For this reason, a power-selling loss J1 is not caused.

Accordingly, the loss index J in the no-load operation mode is a sum of the maintenance loss J2 and the operation loss J3.

Described more specifically, the loss index J in the no-load operation mode is calculated by using the following Equations (5) to (7) by using the inspection intervals INT_CI, INT_TI, and INT_MI, the costs C_CI, C_TI, and C_MI relating to the inspection, the time Δt of the loss period te_r (in other words, the length of the no-load operation time), and a fuel consumption amount F_wait and a fuel unit price Fee_fuel per unit time at the time of performing the no-load operation.

$$J = J2 + J3 \quad (5)$$

[Mathematical Formula 3]

$$J2 = C\_CI \times \frac{\Delta t}{INT\_CI} + C\_TI \times \frac{\Delta t}{INT\_TI} + C\_MI \times \frac{\Delta t}{INT\_MI} \quad (6)$$

$$J3 = F\_wait \times \Delta t \times Fee\_fuel \quad (7)$$

The fuel consumption amount F_wait is in proportion to the turbine rotation speed ωt, and an operation loss J3 calculated using Equation (7) described above is correlated with the size of the diagonal-line area illustrated in FIG. 4.

Equation (6) described above is the same as Equation (4) described above, and thus, the description thereof will not be presented.

Next, the stop mode will be described with reference to FIG. 5. In the loss period te_r, in a case where the stop mode is selected, power generation is not performed (the power generation load Le is zero ("0")), and power selling is not performed. For this reason, the power-selling loss J1 is not caused.

Accordingly, the loss index J in the stop mode is a sum of the maintenance loss J2 and the operation loss J3.

Here, stopping of the power plant has the startup of the gas turbine performed thereafter as a premise, and, in the stop mode, any one of the maintenance loss J2 and the operation loss J3 is a loss focusing on the startup.

Hereinafter, a maintenance loss J2 and an operation loss J3 in the stop mode will be described.

First, the maintenance loss J2 will be described. The maintenance loss J2 is correlated with the speed of consumption of the life of components configuring a power plant. As limits relating to the consumption of the life of the components, there are a limit using an accumulated operation time and a limit using an accumulated number of times of starting-up. While the maintenance loss J2 in the power-selling operation mode and the no-load operation mode relates to the limit of the operation time, the maintenance loss J2 in the stop mode relates to the limit of the number of times of staring-up.

Next, the operation loss J3 will be described. As is apparent from FIG. 5, after the gas turbine is started up, it takes a time until the turbine rotation speed $\omega t$ is stabilized, and it further takes a time until the power generation load Le is stabilized. Accordingly, the amount of fuel (hereinafter, referred to as a startup-time fuel amount) that is needed until the power generation load Le is stabilized from the startup is the operation loss J3 in the stop mode.

Described more specifically, the loss index J in the stop mode is calculated using the following Equations (8) to (10) by using a limit number of times of starting-up Strt_CI until CI is performed, a cost C_CI relating to the CI, a limit number of times of starting-up Strt_TI until TI is performed, a cost C_TI relating to TI, a limit number of times of starting-up Strt_MI until MI is performed, a cost C_MI relating to the MI, and a startup-time fuel amount F_strt and the fuel unit price Fee_fuel.

$$J = J2 + J3 \quad (8)$$

[Mathematical Formula 4]

$$J2 = C\_CI \times \frac{\Delta t}{Strt\_CI} + C\_TI \times \frac{\Delta t}{Strt\_TI} + C\_MI \times \frac{\Delta t}{Strt\_MI} \quad (9)$$

$$J3 = F\_strt \times Fee\_fuel \quad (10)$$

[1-2. Flowchart]

A method of planning an operation plan of a power plant according to this embodiment (hereinafter, also simply referred to as a planning method) will be described with reference to FIG. 6.

Figure 6:
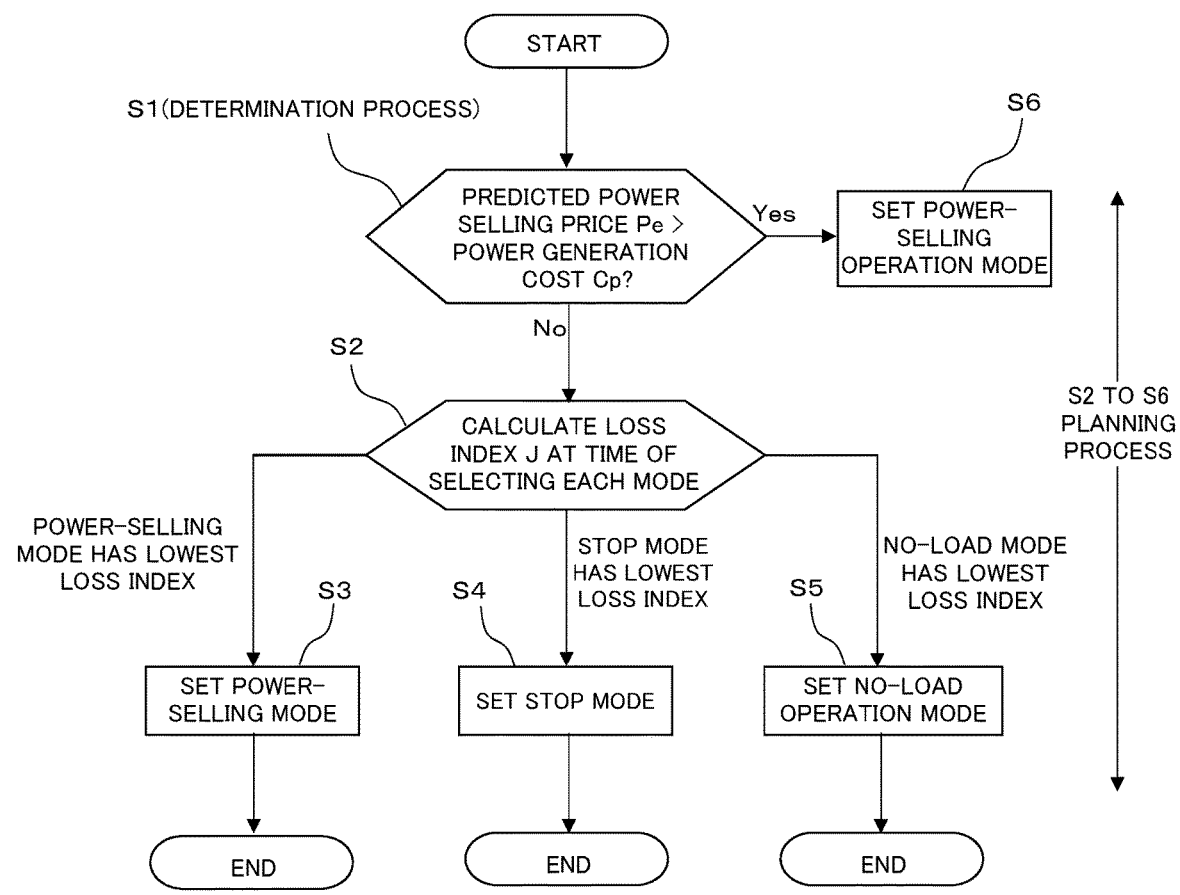
FIG. 6 is a schematic flowchart that illustrates an operation plan planning method of a power plant according to the first embodiment of the present invention.

FIG. 6 is a schematic flowchart that illustrates an operation plan planning method of a power plant according to this embodiment.

In Step S1 (determination process), based on a comparison of a predicted power-selling price Pe with a power generation cost Cp, for a profit period among 24 hours in which the predicted power-selling price Pe is higher than the power generation cost Cp, the process proceeds to Step S6, and the power-selling operation mode is selected. On the other hand, for a loss period te_r in which the predicted power-selling price Pe is equal to the power generation cost Cp or less, the process proceeds to Step S2. In Step S2, a loss index J of a case where each of the power-selling operation mode, the no-load operation mode, and the stop mode is selected as an operation mode is calculated, and an operation mode of which the loss index J is the smallest is selected as an operation mode of this loss period. In other words, in a case where the operation mode of which the loss index J is the smallest is the power-selling operation mode as the operation mode of this loss period, the process proceeds to Step S3, and the power-selling operation mode is selected. On the other hand, in a case where the operation mode of which the loss index J is the smallest is the stop mode, the process proceeds to Step S4, and the stop mode is selected. In addition, in a case where the operation mode of which the loss index J is the smallest is the no-load operation mode, the process proceeds to Step S5, and the no-load operation mode is selected. In other words, a planning process according to this embodiment is configured by Steps S2 to S6.

[1-3. Effect]

According to a planning system (planning method) for the first embodiment, for the profit period in which the predicted power-selling price Pe is higher than the power generation cost Cp, the power-selling operation mode is selected. On the other hand, for the loss period in which the predicted power-selling price Pe is equal to the power generation cost Cp or less, an operation mode of which the loss index is smallest is selected from among the power-selling operation mode, the no-load operation mode, and the stop mode.

Since the loss index is in consideration of the maintenance loss and the operation loss not contributing to the power selling in addition to the power-selling loss, by using a potential loss according to the life consumption is considered, and, by using the operation loss, a loss according to an operation at the time of re-startup or at the time of performing a no-load operation not contributing to the power selling is considered, and an operation mode in the loss period is selected. Accordingly, an operation plan having high profitability can be planned.

2. Second Embodiment

[2-1. Configuration]

An operation plan planning system (planning method) for a power plant according to a second embodiment of the present invention will be described with reference to FIGS. 7A and 7B.

Figure 7A:
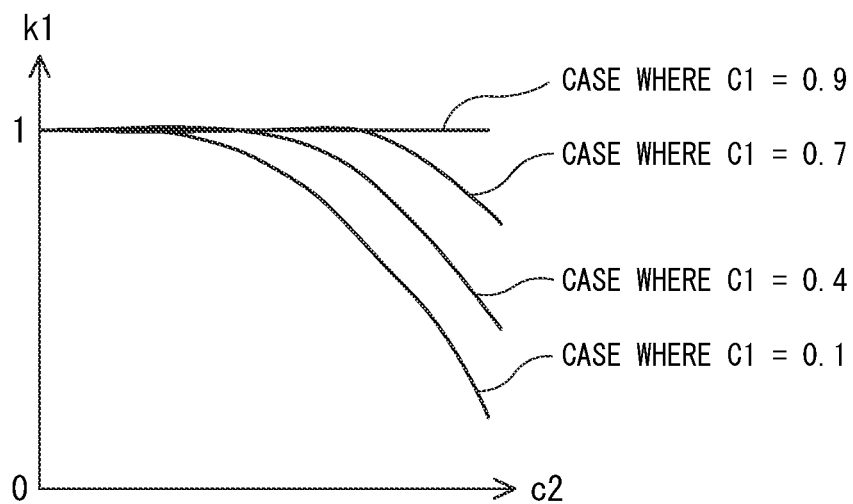
FIGS. 7A and 7B are maps that are used for determining weighting coefficients according to a second embodiment of the present invention.
Figure 7B:
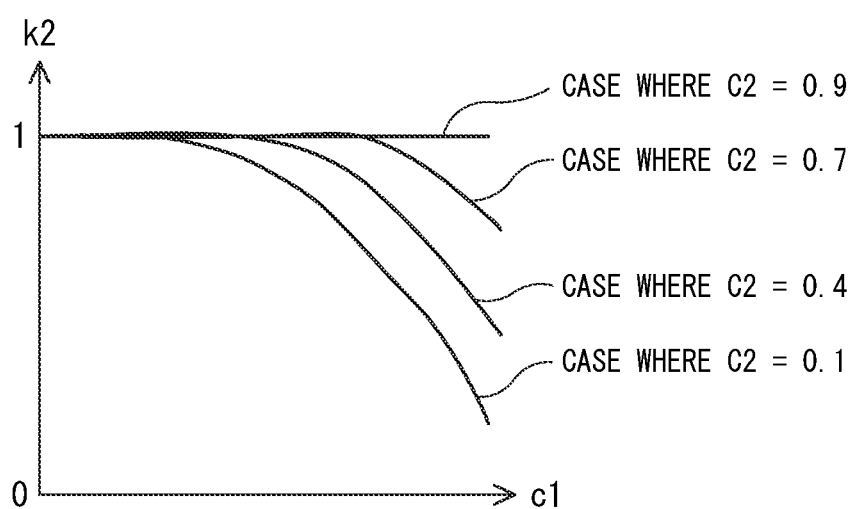

FIGS. 7A and 7B are maps used for determining a weighting coefficient according to a second embodiment of the present invention.

In the operation plan planning system (planning method) for a power plant according to the second embodiment of the present invention, functions are added to the planning unit (planning method) of the operation plan planning system (planning method) for a power plant according to the first embodiment. Hereinafter, this point will be described.

As described above in the first embodiment, as the limits relating to the consumption of the life of a component, there are a limit according to an accumulated operation time and a limit according to an accumulated number of times of starting-up. Out of these limits, in a case where any one reaches a limit value, inspection is performed, and repair or replacement needs to be performed.

For this reason, in a case where the accumulated operation time reaches a limit time (hereinafter, also referred to as an operation time life), a corresponding component needs to be repaired or replaced also in a case where there is a room in the accumulated number of times of starting-up with respect to the limit number of times (hereinafter, also referred to as an operation number of times life). Similarly, in a case where the accumulated number of times of starting-up reaches a limit number of times, a corresponding component needs to be repaired or replaced also in a case where there is a room in the accumulated operation time with respect to the limit time.

Accordingly, an operation is an in which the accumulated operation time and the accumulated number of times of starting-up simultaneously reaches the limits. For this reason, in this embodiment, a component is controlled to be used up (consumed) such that both the accumulated operation time and the accumulated number of times of starting-up are near the limit values.

Hereinafter, the accumulated operation time or the accumulated number of times of starting-up being close to the limit value will be represented as consuming of the life.

Here, the consumption of the life relates to the maintenance loss J2 among the elements of the loss index J. In each of the power-selling operation mode and the no-load operation mode, startup of the power plant is not accompanied, and accordingly, in the maintenance loss J2, a loss (operation time loss) according to life consumption relating to the accumulated operation time is a main factor. To the contrary, since the maintenance loss J2 of the stop mode accompanies re-startup, the loss (the number of times of starting-up loss) according to life consumption relating to the accumulated number of times of starting up is a main factor.

Thus, in this embodiment, for the power-selling operation mode and the no-load operation mode, the maintenance loss J2 is calculated using the following Equation (11). In other words, the equation for calculating J2 according to the first embodiment is multiplied by a weighting coefficient (first weighting coefficient) k1.

[Mathematical Formula 5]

$$J2\left(C\_CI \times \frac{\Delta t}{INT\_CI} + C\_TI \times \frac{\Delta t}{INT\_TI} + C\_MI \times \frac{\Delta t}{INT\_MI}\right) \times k1 \quad (11)$$

In addition, for the stop mode, the maintenance loss J2 is calculated using the following Equation (12). In other words, the equation for calculating the maintenance loss J2 according to the first embodiment is multiplied by a weighting coefficient (second weighting coefficient) k2.

[Mathematical Formula 6]

$$J2\left(C\_CI \times \frac{\Delta t}{Strt\_CI} + C\_TI \times \frac{\Delta t}{Strt\_TI} + C\_MI \times \frac{\Delta t}{Strt\_MI}\right) \times k2 \quad (12)$$

The weighting coefficients k1 and k2 are determined according to the maps illustrated in FIGS. 7A and 7B stored in the storage unit 29 in advance by using a ratio (the accumulated startup time/the operation time life; hereinafter, referred to as an operation time life consumption ratio) C1 of the accumulated operation time to the operation time life and a ratio (the accumulated number of times of starting-up/the number of times of starting-up life; hereinafter referred as a number of times of starting-up life consumption ratio) C2 of the accumulated number of times of starting-up to the number of times of starting-up life.

In other words, as illustrated in FIG. 7A, as the number of times of starting-up life consumption ratio C2 increases, and, as the operation time life consumption ratio C1 decreases, the weighting coefficient k1 is set to be smaller. In addition, as illustrated in FIG. 7B, as the operation time life consumption ratio C1 increases, and, as the number of times of starting-up life consumption ratio C2 decreases, the weighting coefficient k2 is set to be smaller.

In addition, by performing switching between the maps, the weighting coefficients k1 and k2 may be calculated using functions of the life consumption ratios C1 and C2.

Furthermore, according to the ratio between the operation time life consumption ratio C1 and the number of times of starting-up life consumption ratio C2, the weighting coefficients k1 and k2 may be determined using maps or functions.

[2-2. Effect]

According to the planning system (planning method) for the second embodiment, there are the following effects in addition to the effects of the first embodiment.

By setting the weighting coefficient k1 to be smaller as the number of times of starting-up life consumption ratio C2 increases, and, as the operation time life consumption ratio C1 decreases, the maintenance loss J2 and consequently, the loss index J of the power-selling operation mode and the no-load operation mode calculated using the weighting coefficient k1 is calculated to be smaller. As a result, compared with a case where no weighting coefficient is used, the power-selling operation mode or the no-load operation mode consuming the operation time life can be relatively easily selected.

To the contrary, by setting the weighting coefficient k2 to be smaller as the operation time life consumption ratio C1 increases, and, as the number of times of starting-up life consumption ratio C2 decreases, the maintenance loss J2 and consequently, the loss index J of the stop mode calculated using the weighting coefficient k2 is calculated to be smaller. As a result, compared with a case where no weighting coefficient is used, the stop mode consuming the operation time life can be relatively easily selected.

In this way, as the operation time life consumption ratio C1 decreases, the power-selling operation mode or the no-load operation mode consuming the operation time life can be easily selected as the operation mode, and, as the number of times of starting-up life consumption ratio C2 decreases, the stop mode consuming the number of times of starting-up life can be easily selected as the operation mode. Accordingly, it is suppressed that the consumption inclines to one of the number of times of starting-up life and the starting-up time life, and accordingly, a repair cost or a replacement cost accompanied with the consumption of the component can be suppressed.

[2-3. Others]

In the embodiment described above, as the number of times of starting-up life consumption ratio C2 increases, while the weighting coefficient k1 is set to be smaller, and the weighting coefficient k2 is set to be larger, as the number of times of starting-up life consumption ratio C2 increases, only the weighting coefficient k1 may be set to be smaller, or only the weighting coefficient k2 may be set to be larger.

Similarly, in the embodiment described above, as the operation time life consumption ratio C1 increases, while the weighting coefficient k2 is set to be smaller, and the weighting coefficient k1 is set to be larger, as the operation time life consumption ratio C1 increases, only the weighting coefficient k2 may be set to be smaller, or only the weighting coefficient k1 may be set to be larger.

3. Third Embodiment

[3-1. Configuration]

An operation plan planning system (planning method) for a power plant according to a third embodiment of the present invention will be described with reference to FIG. 8.

Figure 8:
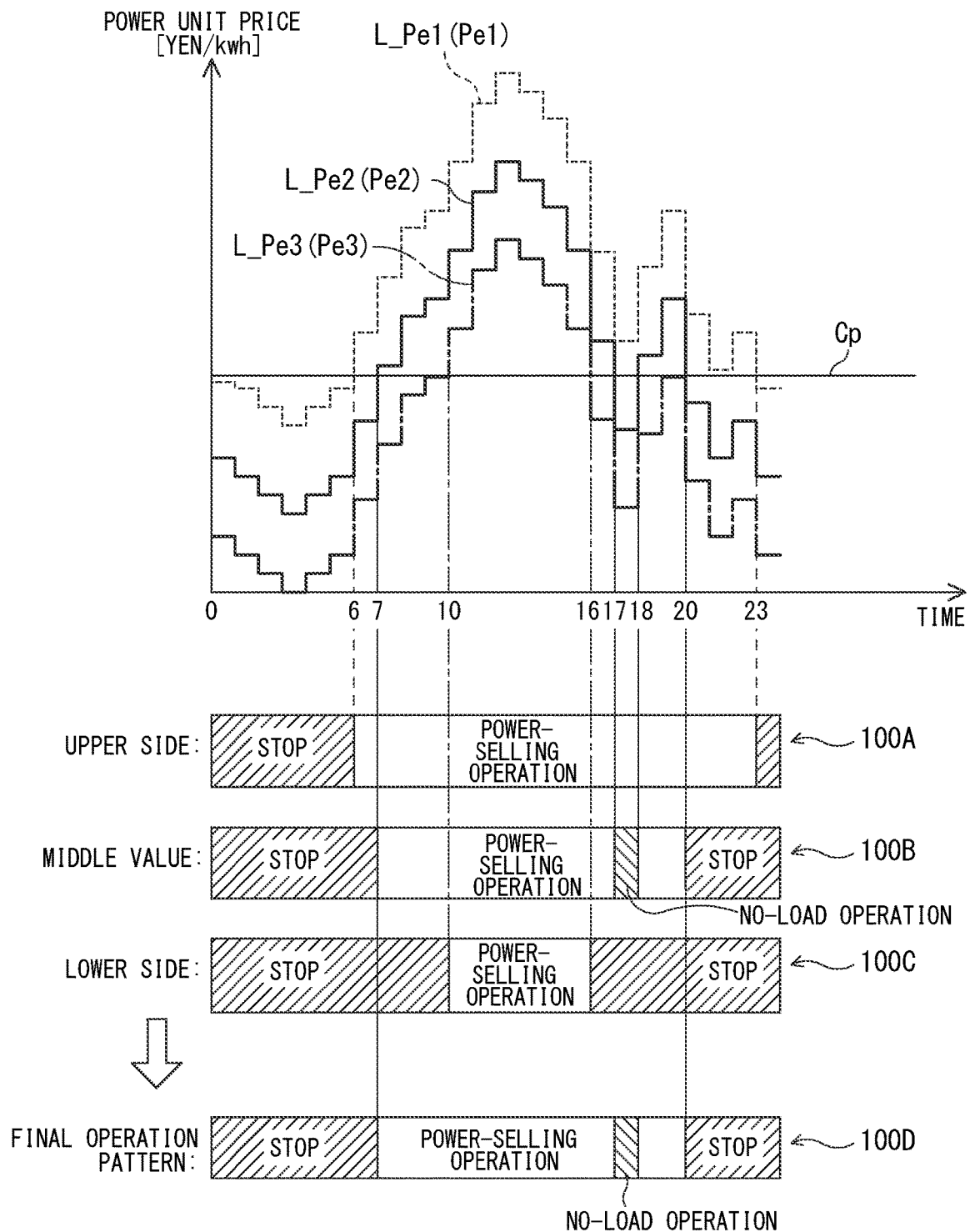
FIG. 8 is a schematic diagram that illustrates an additional function of a planning unit according to a third embodiment of the present invention and is a diagram in which predicted power-selling prices Pe1, Pe2, and Pe3 and a power generation cost Cp are plotted on a graph having the power unit price as the vertical axis and the time as the horizontal axis, and operation plans are illustrated to be aligned.

FIG. 8 is a schematic diagram that illustrates an additional function of a planning system (planning method) according to the third embodiment of the present invention and is a diagram in which examples of predicted power-selling prices Pe1, Pe2, and Pe3 and a power generation cost Cp are plotted on a graph having the power unit price as the vertical axis and the time as the horizontal axis, and operation plans (an operation mode selected for each time) are illustrated to be superimposed thereon.

In the operation plan planning system (planning method) for a power plant according to the third embodiment of the present invention, for the first embodiment, a function is added to a predicted power-selling price setting unit, and a function is added to a planning unit. Hereinafter, these points will be described.

The predicted power-selling price setting unit predicts three predicted power-selling price lines L_Pe1, L_Pe2, and L_Pe3 of a prediction target date (here, the next day of the bidding) based on past results. Such predicted power-selling price lines L_Pe1, L_Pe2, and L_Pe3 respectively represent 24-hour transitions of predicted power-selling prices Pe1, Pe2, and Pe3.

The predicted power-selling price Pe2 is a price acquired by correcting an average value of the past results by using the weather, the temperature, and the like. The predicted power-selling prices Pe1 and Pe3 are prices predicting variations from the average value of the past results. The predicted power-selling price Pe1 is a highest predicted power-selling price acquired by adding a maximum variation of the high price side to the average value, and the predicted power-selling price Pe3 is a lowest predicted power-selling price acquired by subtracting a maximum variation of the low price side to the average value. Thus, the predicted power-selling price Pe1 is also referred to as a highest predicted power-selling price Pe1, the predicted power-selling price Pe2 is also referred to as an average power-selling price Pe2, and the predicted power-selling price Pe3 is also referred to as a lowest predicted power-selling price Pe3.

Similar to the first embodiment, the predicted power-selling price setting unit is not indispensable, but predicted power-selling price information may be acquired from the outside, and the acquired information may be stored in a storage unit.

The planning unit plans three operation plans by using the predicted power-selling prices Pe1, Pe2, and Pe3. In other words, the planning unit plans a provisional operation plan 100A based on a result of a comparison between the price cost Cp and the highest predicted power-selling price line L_Pe1 (highest predicted power-selling price Pe1) performed by the determination unit, the planning unit plans a provisional operation plan 100B based on a result of a comparison between the price cost Cp and the average predicted power-selling price line L_Pe2 (average predicted power-selling price Pe2) performed by the determination unit, and the planning unit plans a provisional operation plan 100C based on a result of a comparison between the price cost Cp and the lowest predicted power-selling price line L_Pe3 (lowest predicted power-selling price Pe3) performed by the determination unit 23.

Each of the provisional operation plans 100A, 100B, and 100C are planned using a method that is the same as the method of generating the one-day operation plan based on a comparison between the price cost Cp and the predicted power-selling price line L_Pe (predicted power-selling price Pe) in the first embodiment.

Then, the planning unit determines a final operation plan (hereinafter, also referred to as a main operation plan) 100D by composing such provisional operation plans 100A, 100B, and 100C. In this composition, for every one hour, an operation mode that is included the most in the operation modes configuring the provisional operation plans 100A, 100B, and 100C is employed as an operation mode of the time, and, in a case where all the operation modes of the provisional operation plans 100A, 100B, and 100C are different from one another, an operation mode of the provisional operation plan 100B that is based on the average predicted power-selling price Pe2 is employed as the operation mode of that time.

In the example illustrated in FIG. 8, between 0 o'clock to 6 o'clock, any one of the provisional operation plans 100A, 100B, and 100C is the stop mode, and accordingly, the stop mode is selected also in the main operation plan 100D. Between 6 o'clock to 7 o'clock, the power-selling operation mode is employed in the provisional operation plan 100A, and the stop mode is employed in the provisional operation plans 100B and 100C, and thus, in the main operation plan 100D, the stop mode that is employed the most is selected. Between 7 o'clock to 10 o'clock, the power-selling operation mode is employed in the provisional operation plans 100A and 100B, and the stop mode is employed in the provisional operation plan 100C, and thus, in the main operation plan 100D, the power-selling mode that is employed the most is selected. Similarly, each one hour of 10 o'clock to 17 o'clock and 18 o'clock and 24 o'clock, an operation mode that is employed the most in the provisional operation plans 100A, 100B, and 100C is selected in the main operation plan 100D.

Between 17 o'clock to 18 o'clock, the power-selling operation mode is selected in the provisional operation plan 100A, the no-load operation mode is selected in the provisional operation plan 100B, and the stop mode is selected in the provisional operation plan 100C. Thus, the operation modes employed in the provisional operation plans 100A, 100B, and 100C are different from one another, and accordingly, the no-load operation mode employed in the provisional plan 100B is selected in the main operation plan 100D.

[3-2. Effect]

According to the planning system (planning method) for the third embodiment, provisional operation plans are planned based on three predicted power-selling prices including the highest predicted power-selling price Pe1, the average predicted power-selling price Pe2, and the lowest predicted power-selling price Pe3, and a final operation plan is set by composing these provisional operation plans. Accordingly, even in a case where an actual power-selling price greatly deviates from an average predicted value, an operation plan that can respond thereto can be employed.

[3-3. Others]

(1) In the embodiments described above, in a case where all the operation modes of the provisional operation plans 100A, 100B, and 100C are different from one another, while the operation mode of the provisional operation plan 100B that is based on the average predicted power-selling price Pe2 is employed as the operation mode of that time, in a case where all the operation modes of the provisional operation plans 100A, 100B, and 100C are different from one another, an operation mode to be selected may be selected by a user by using an input unit (selected operation mode acquiring unit) 3. In such a case, a mode employed by the provisional operation plan 100B may be displayed on a displaying unit (recommended operation mode displaying unit) 4 as a recommended mode.

In such a case, in a case where all the modes of the provisional operation plans 100A, 100B, and 100C are different from one another, the mode can be selected based on the user's knowledge.

(2) When the provisional operation plans 100A, 100B, and 100C are planned, as in the second embodiment, the maintenance loss J2 may be calculated using the weighting coefficients k1 and k2.

[4. Others]

(1) In each embodiment described above, while the power plant has been described as the gas turbine combined cycle power plant (GTCC), the planning system (planning method) for an operation plan of a power plant according to the present invention is not limited to the application of the GTCC. For example, the planning system (planning method) may be also applied to a conventional thermal power plant configured by a steam boiler and a steam turbine.

(2) Also in a case where bidding is performed for a time period in which the power-selling operation mode is employed based on an operation plan planned by the planning system (planning method), there are cases where a successful bid is not made. In such cases, for a time period in which a successful bid is not made, the loss indexes J are respectively calculated in a case where the no-load operation mode is selected and a case where the stop mode is selected, and an operation mode of which the loss index J is smaller may be employed by performing switching from the power-selling mode.

(3) When an operation mode is selected based on a comparison of loss indexes J, in a case where a difference $\Delta J$ between a smallest loss index and a second smallest loss index is within a reference value $\Delta J0$, one of the operation mode of which the loss index is the smallest and the operation mode of which the loss index is the second smallest may be selected by a user. The reference value $\Delta J0$ described above, for example, may be set based on predicted precision of the predicted power-selling price Pe.

REFERENCE SIGNS LIST

1 OPERATION PLAN PLANNING SYSTEM FOR POWER PLANT (PLANNING SYSTEM)
2 PLANNING APPARATUS
3 INPUT UNIT (SELECTED OPERATION MODE ACQUIRING UNIT)
4 DISPLAYING UNIT (RECOMMENDED OPERATION MODE DISPLAYING UNIT)
21 PREDICTED POWER-SELLING PRICE SETTING UNIT
22 DETERMINATION UNIT
23 PLANNING UNIT
29 STORAGE UNIT
100, 100D OPERATION PLAN
100A, 100B, AND 100C PROVISIONAL OPERATION PLAN
C1 NUMBER OF TIMES OF STARTING-UP LIFE CONSUMPTION RATIO
C2 OPERATION TIME LIFE CONSUMPTION RATIO
CP POWER GENERATION COST
C_CI COST RELATING TO CI
C_MI COST RELATING TO MI
C_TI COST RELATING TO TI
F_wait FUEL CONSUMPTION AMOUNT
Fee_fuel FUEL UNIT PRICE
F_strt FUEL AMOUNT AT TIME OF STARTING-UP
J LOSS INDEX
J1 POWER-SELLING LOSS
J2 MAINTENANCE LOSS
J3 OPERATION LOSS
k1 WEIGHTING COEFFICIENT (FIRST WEIGHTING COEFFICIENT)
k2 WEIGHTING COEFFICIENT (SECOND WEIGHTING COEFFICIENT)
L_Pe, L_Pe1, L_Pe2, and L_Pe3 PREDICTED POWER-SELLING PRICE LINE
Le POWER GENERATION LOAD
Pe1, Pe2, and Pe3 PREDICTED POWER-SELLING PRICE
Strt_CI LIMIT NUMBER OF TIMES OF STARTING-UP OF CI
Strt_MI LIMIT NUMBER OF TIMES OF STARTING-UP OF MI
Strt_TI LIMIT NUMBER OF TIMES OF STARTING-UP OF TI
te_p PROFIT PERIOD
te_r LOSS PERIOD
$\Delta C$ LOSS PER UNIT POWER GENERATION AMOUNT
INT_CI INTERVAL UNTIL CI IS PERFORMED
INT_MI INTERVAL UNTIL MI IS PERFORMED
INT_TI INTERVAL UNTIL TI IS PERFORMED
Le POWER GENERATION LOAD IN LOSS PERIOD te_r
$\Delta t$ TIME OF LOSS PERIOD te_r
$\Delta J$ DIFFERENCE BETWEEN SMALLEST LOSS INDEX AND SECOND SMALLEST LOSS INDEX
$\Delta J0$ REFERENCE VALUE OF $\Delta J$
$\omega t$ TURBINE ROTATION SPEED

The invention claimed is:

1. A planning system for planning an operation plan of a power plant, wherein the power plant is capable of executing one of a first operation mode driving a power generator by using a turbine and a second operation mode not driving the power generator by using the turbine over a predetermined period, the planning system comprising:

a determination unit configured to determine whether or not a predicted power-selling price is higher than a power generation cost; and a planning unit configured to calculate a loss index of each of the first operation mode and the second operation mode in a case where the predicted power-selling price is equal to the power generation cost or less within the predetermined period and to plan the operation plan such that the power plant is operated in an operation mode of which the loss index is smaller, wherein the loss index corresponding to the first operation mode includes a power-selling loss that is a difference between the predicted power-selling price and the power generation cost, the loss index corresponding to the second operation mode includes a loss that is caused by not driving the power generator, each of the loss index corresponding to the first operation mode and the loss index corresponding to the second operation mode further includes a maintenance loss, the second operation mode includes a no-load operation mode operating in a state in which the turbine and the power generator are disconnected from each other and a stop mode stopping the turbine, the maintenance loss includes an operation time loss consuming a life relating to an operation time of a component configuring the power plant according to an accumulated operation time of the power plant and a number of times of starting-up loss consuming a life relating to the number of times of starting up of the component according to an accumulated number of times of starting up of the power plant, the maintenance loss of each of the first operation mode and the no-load operation mode has the operation time loss as a main factor, the maintenance loss of the stop mode has the number of times of starting-up loss as a main factor, and wherein the planning unit is configured to:

determine the maintenance loss of each of the first operation mode and the no-load operation mode by using a first weighting coefficient;

determine the maintenance loss of the stop mode by using a second weighting coefficient;

to decrease the first weighting coefficient, increase the second weighting coefficient, or decrease the first weighting coefficient and increase the second weighting coefficient as a ratio of the accumulated number of times of starting up to the number of times of starting up increases, and to increase the first weighting coefficient, decrease the second weighting coefficient, or increase the first weighting coefficient and decrease the second weighting coefficient as a ratio of the accumulated operation time to the life relating to the operation time increases.

2. The planning system according to claim 1, wherein the operation loss includes a fuel cost not contributing to power generation that is consumed at the time of staring up the power plant and at the time of a no-load operation.

3. A planning system for planning an operation plan of a power plant, wherein the power plant is capable of executing one of a first operation mode driving a power generator by using a turbine and a second operation mode not driving the power generator by using the turbine over a predetermined period, the planning system comprising:

a determination unit configured to determine whether or not a predicted power-selling price is higher than a power generation cost; and a planning unit configured to calculate a loss index of each of the first operation mode and the second operation mode in a case where the predicted power-selling price is equal to the power generation cost or less within the predetermined period and to plan the operation plan such that the power plant is operated in an operation mode of which the loss index is smaller, wherein the loss index corresponding to the first operation mode includes a power-selling loss that is a difference between the predicted power-selling price and the power generation cost, the loss index corresponding to the second operation mode includes a loss that is caused by not driving the power generator, three prices of a lowest predicted power-selling price, an average predicted power-selling price, and a highest predicted power-selling price are used as the predicted power-selling price, the determination unit compares each of the lowest predicted power-selling price, the average predicted power-selling price, and the highest predicted power-selling price with the power generation cost and determines whether or not the predicted power-selling price is higher than the power generation cost, and the planning unit plans a provisional operation plan for the predetermined period by performing the selection control for each of the lowest predicted power-selling price, the average predicted power-selling price, and the highest predicted power-selling price and plans the operation plan by composing a first provisional operation plan based on the lowest predicted power-selling price, a second provisional operation plan based on the average predicted power-selling price, and a third provisional operation plan based on the highest predicted power-selling price.

4. The planning system according to claim 3, wherein the planning unit performs the composition by employing the operation mode that is selected most among the operation modes selected for the same time for each of the first provisional operation plan, the second provisional operation plan, and the third provisional operation plan.

5. The planning system according to claim 4, wherein the planning unit performs the composition by employing the operation mode selected in the second provisional operation plan in a case where the operation mode selected for the same time is different in each of the first provisional operation plan, the second provisional operation plan, and the third provisional operation plan.

6. The planning system according to claim 4, further comprising a selection operation mode acquiring unit, wherein the planning unit performs the composition by employing the operation mode acquired by the selection operation mode acquiring unit in a case where the operation mode selected for the same time is different in each of the first provisional operation plan, the second provisional operation plan, and the third provisional operation plan.

7. The planning system according to claim 6, further comprising a recommended operation mode displaying unit, wherein the planning unit causes the recommended operation mode displaying unit to display the operation mode of the second provisional operation plan as a recommended operation mode in a case where the operation mode selected for the same time is different in each of the first provisional operation plan, the second provisional operation plan, and the third provisional operation plan.

8. The planning system according to claim 3, wherein the operation loss includes a fuel cost not contributing to power generation that is consumed at the time of staring up the power plant and at the time of a no-load operation.

* * * * *